United States Patent [19]

Bastida

[11] Patent Number: 4,458,530
[45] Date of Patent: Jul. 10, 1984

[54] MICROWAVE SENSOR FOR CHECKING THE LEVEL OF THE MOLTEN METAL IN CONTINUOUS CASTING PROCESSES

[75] Inventor: Ezio M. Bastida, Segrate, Italy

[73] Assignees: CISE - Centro Informazioni Studi Esperienze S.p.A.; Senamion s.a.s., both of Milan, Italy

[21] Appl. No.: 354,401

[22] Filed: Mar. 3, 1982

[30] Foreign Application Priority Data

Mar. 9, 1981 [IT] Italy ............................. 20232 A/81

[51] Int. Cl.$^3$ ............................................. G01F 23/00
[52] U.S. Cl. ................................. 73/290 R; 343/17.7
[58] Field of Search ..................... 73/290 V, 290 R; 324/58.5 BR, 204, 207, 208; 367/908; 343/17.7

[56] References Cited

U.S. PATENT DOCUMENTS

| 3,836,846 | 9/1974 | Overall et al. | 324/58.5 B |
| 4,030,027 | 6/1977 | Yamada et al. | 324/207 |
| 4,044,353 | 8/1977 | Levy | 343/14 |
| 4,044,354 | 8/1977 | Bosher et al. | 343/14 |
| 4,054,255 | 10/1977 | Magenheim | 324/58.5 B |
| 4,183,007 | 1/1980 | Baird | 367/908 |
| 4,210,023 | 7/1980 | Sakamoto et al. | 73/290 R |

FOREIGN PATENT DOCUMENTS 46-3340  1/1971  Japan ............................. 324/58.5 B

OTHER PUBLICATIONS

Cronson, Wide-Band Directional Coupler, 3-1976.

Primary Examiner—Gerald Goldberg
Assistant Examiner—Hezron E. Williams
Attorney, Agent, or Firm—Karl W. Flocks; Sheridan Neimark; A. Fred Starobin

[57] ABSTRACT

A device capable of measuring the position of the level surface of a molten metal bath by exploiting a microwave signal emerging from a waveguide which impinges perpendicularly onto the molten metal so as to originate a standing wave, the position of which is determined by the position of the level surface. The parameters of the standing wave are detected so as to obtain an indication as to the level.

7 Claims, 4 Drawing Figures

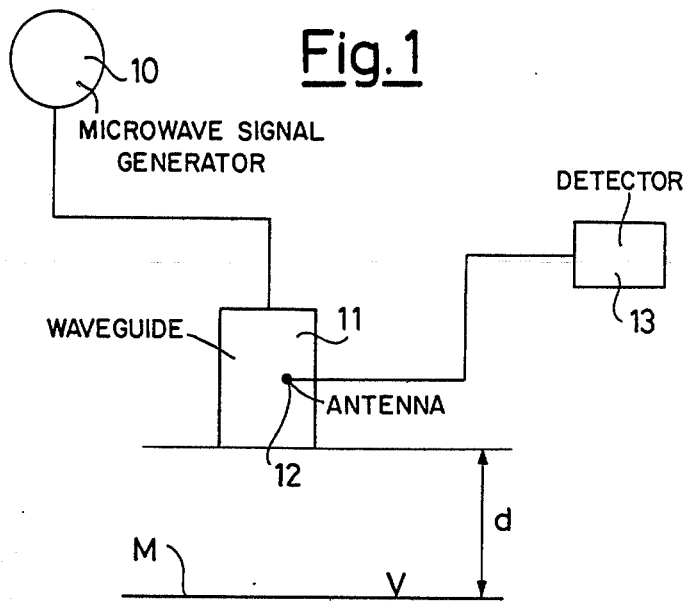
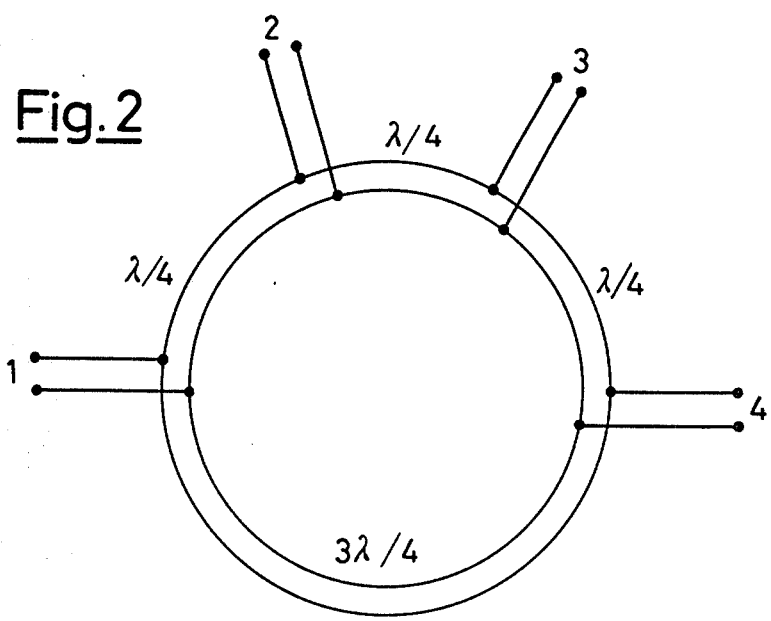

MICROWAVE SENSOR FOR CHECKING THE LEVEL OF THE MOLTEN METAL IN CONTINUOUS CASTING PROCESSES

The level of the molten metal bath in continuous casting processes has been carried out manually long since. This procedure, however, compels the operators entrusted with said manual checking operation to work in a very dangerous area of the steel works, just in the vicinity of the casting zone. To offset this necessity, automatic checking systems have been suggested, which use optical and magnetic sensors and thermocouples.

The optical sensors, however, deliver a signal which is a function of the thickness of the antioxidizer powder which coats the molten metal surface and are often disturbed by the radiations delivered by the metal itself.

The magnetic sensors are exceedingly sensitive to disturbances coming from other sections of the steel works, such as arc furnaces, induction furnaces and the like.

The response times of the thermocouples are too long so that an efficient automatic check of the molten metal level cannot be carried out.

An object of this invention is, therefore, to provide a sensor capable of giving a quick response and which is insensitive to disturbances of various origin, while giving a response which is little influenced by the thickness of the antioxidizer powder layer.

To achieve this object, the invention suggests to provide a device for measuring the level of molten metal, said device being characterized in that it comprises a microwave signal generator connected to a radiating head consisting of a waveguide arranged with its axis perpendicular to the metal surface so as to receive the reflected wave, sensing means being further provided to sense, in a position fixed in space, the magnitude of the field generated by the standing wave which is established in the waveguide and to deliver a signal, which is a function of said field magnitude, to a detecting means.

In order that the basic principles of the invention may better be appreciated, two nonlimiting exemplary embodiments of the invention will be described hereinafter with reference to the accompanying drawings, wherein:

FIG. 1 is a diagram of a first embodiment of the device according to the invention.

FIG. 2 and FIG. 3 are diagrams of hybrid ring directional couplers which are useful for a second device according to the invention.

Figure 3:
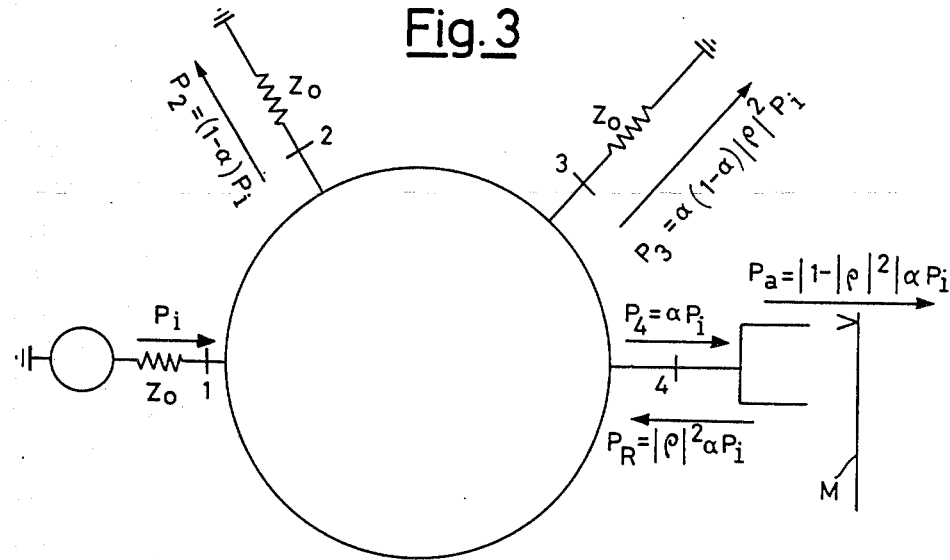

The first embodiment of the measuring device according to the invention shown in FIG. 1 essentially comprises a microwave signal generator, 10, which delivers said signal to a waveguide 11 which is directed perpendicularly to the molten metal bath surface M.

Within the waveguide a sensor is arranged, which consists of an antenna, 12, capable of sensing the amplitude of the electric or magnetic field which is present in that particular point of the waveguide.

The signal received by the antenna 12 will be a function of its distance from the metal bath surface M, so that it will be capable of giving an indication of said distance by means of a detector 13 connected to the antenna aforesaid.

In order that the functional principles underlying said device according to the invention may better be appreciated, it will be fitting to develop a few considerations as to the main component parts of the circuitry illustrated in FIG. 1.

Assuming that the waveguide 11 consists of a cylindrical tube having a circular cross-section wherein a microwave signal is propagated, and assuming also that a metallic planar surface (simulating the metal bath surface M) is placed in front to a tube end, perpendicularly to the tube axis, the signal coming from the tube will be reflected by the metallic planar surface and, if the distance of the latter from the tube end does not exceed the wavelength $\lambda$ of the signal, only a small fraction of the reflected power will be scattered by irradiation, whereas the remaining fraction will come back to the tube, thus generating a signal which will be propagated in a direction which is opposite to that of the wave which impinges on the metallic planar surface.

The tube and the portion of space between it and the metallic planar surface thus become the seat of standing wave phenomenon. Along the tube and in the portion of the space between it and the metallic planar surface, one obtains nodes and antinodes both for electric and magnetic fields. The distance between the node and its next antinode will be one quarter of the wavelength, $\lambda$.

Since the amplitude of the electric field will be zero on the metallic planar surface, there will be, in that location, and of necessity, a node of an electric field.

Summing up, one will see an electric field node on the metallic planar surface, an antinode at a distance $\lambda$ 4 from said metallic planar surface, a node at a distance $2\lambda/4 = \lambda/2$ from the metallic planar surface, a node at a distance $3\lambda/4$ from the metallic planar surface and so forth.

Similar consideration holds true for the magnetic field.

Let it be assumed, now, to shift the metallic planar surface along the direction of the tube: all the nodes and the antinodes of the electric field standing wave will be subjected to the same motion.

Let it now be assumed to introduce, along a radius of the tube, an antenna of a small size, which, when connected to an appropriate detector, supplies a continuous voltage V proportional to the square of the field which is present at that point of the tube. For small signals, a linear relationship between the voltage and the field amplitude could be experienced. Thus, a signal will be obtained, which is a function of the distance, d, of the metallic sheet from the tube opening, of the kind:

$$V(d) = \alpha \left( 1 - \sin \frac{4\pi}{\lambda} (d - d_o) \right)^n$$

wherein $\alpha$ is a positive constant which is a function of the sensitivity of the detector, $d_o$ is a constant which is a function of the electrical distance between the metal plane and the antenna, $n=2$ for a detector having a response curve of the square type and $n=1$ for a detector having a response curve of the linear type.

The measuring procedure carried out by the device according to the invention is based on the relationship reported above. Let it be considered, at the outset, that the voltage V(d) has a periodic trend according to the distance d of the metallic planar surface from the waveguide end, the period being $\lambda/2$. The result is that, if the variations of the distance d, are contained within a range of amplitude corresponding to one half-period, that is, within a λ/4, the mere readout of the value of the voltage V gives an univocal indication of the position of the metallic planar surface.

The pattern described hereinbefore requires the use of an antenna, 12, which is a circuit element of a sensitive nature and which might thus impair the reliability of the device and raise its cost. For these reasons, it is possible to adopt a different approach which dispenses with the use of the antenna.

This object can be attained by an appropriate circuit topology using a directional coupler, said configuration being also a part of the invention, inasmuch as it provides for an unusual exploitation of said coupler in order that a particular technical effect may be produced.

An ideal directional coupler essentially consists of a four-port network which is so embodied that all the power which comes to a port emerges again, properly sub-divided, from two ports only (coupled ports) whereas nothing exists the remaining port (insulated port). The greater is the power percentage existing a coupled port, the smaller will consequently be the one exiting the other port. An example of a directional coupler is the hybrid ring, as diagrammatically depicted in FIG. 2. It consists of three sections of a transmission line λ/4 and a fourth line section having a length 3λ/4.

Let it now be assumed to send a microwave signal to the port 1: it will be split, when entering the ring, into two parts which will reach the port 4 with a zero relative phase shift, whereas they will reach the port 3 with a relative phase shift of $\pi$ and with their amplitudes unaltered and the port 2 will be reached with a relative phase shift equal to $2\pi$. Thus, while the ports 2 and 4 will receive signals the amplitudes of which are summed (coupled ports), the port 3 will never receive a signal (insulated port). Should the signal enter the port 4, the ports 1 and 3 would be coupled, by symmetry, and the port 2 would be insulated. Similar considerations can obviously be repeated if the feed takes place through any of the remaining ports.

The condition that the signals which reach the insulated port are thoroughly annulled is satisfied, obviously, only if working at a frequency $f_o$ for which the several line sections enumerated above are rigorously equal to λ/4 and (¾)λ, respectively. Therefore, if the frequency deviates from $f_o$, a signal will emerge from the insulated port, the amplitude of such signal being increased as the deviation value is increased, the insulation of the coupler being thus degraded.

Let it be assumed that the port 1 is connected to a nonreflecting generator, the ports 2 and 3 to an equally nonreflecting (matched) load and the port 4 to a reflecting (mismatched) load, as diagrammatically shown in FIG. 3. Under such conditions, the power $P_i$ entering the port 1, will emerge again through the ports 2 and 4. The power emerging through the port 2, which is $P_2=(1-\alpha)P_i (0<\alpha<1)$ will completely be absorbed, whereas the power emerging through the port 4, which is $P_4=\alpha P_i$, will reach the mismatched load and will partially be absorbed ($P_a=(1-|\rho|^2)\alpha P_i$, with $\rho$=reflection coefficient) and partially be reflected ($P_R=|\rho|^2\alpha P_i$).

The reflected power $P_R$ will enter the port 4 of the coupler again and will emerge once more through the ports 1 and 3, wherein it will completely be absorbed. The portion emerging through the port 3, more particularly, will be $P_3=\alpha(1-\alpha)P_i|\rho|^2$, that is to say, it will be directly proportional to the square power of the module of the reflection coefficient of the load connected to the port 4.

Inasmuch as only the phase of the wave reflected by that load varies as the position of the load is varied, whereas the amplitude remains constant, the result is that a measurement of the power of the output signal from the port 3 will give, if the coupler works correctly, that is to say with an ideal insulation, a reading which is independent of the position of the reflecting load so that it cannot be used for indirect positional measurements. In order to make clear that, conversely, this can be made in the case in which the coupler does not work near the ideal conditions, that is to say, it has a poor insulation, one should consider the assumption of working, with the coupler of FIG. 3, at a frequency, f, different from $f_o$. If so, a portion, equal to K $P_i$, of the power $P_i$ that the generator delivers to the port 1, will emerge from the port 3, that which is equivalent to stating that the port 3 will no longer be perfectly insulated. This signal will be summed, with a phase shift depending on the position of the reflecting load, to the signal, the behavior of which has been outlined above for the case in which the coupler works in an ideal way. Thus, a signal will be generated, the amplitude of which will depend on the position of the reflecting short circuit (that is, the liquid surface of the molten steel). It will thus suffice to measure, with a detector, the amplitude of the latter signal.

By so doing, an output signal is obtained which is wholly similar to that which would be obtained by employing an antenna inserted into the waveguide as outlined above.

In order that the best exploitation of the effect of the variable phase shift may be achieved, it is required that the two signals which are summed in phase have substantially the same amplitude, so that the detected voltage is zero when the two signals have a phase shift between them of 180°. For this reason it is appropriate to design the coupler in such a manner that the port 3 is not insulated from the input port 1, but couples a portion $KP_i$, of the power $P_i$ incoming from the generator be equal to the power $P_3$. This means that $K=\alpha(1-\alpha)|\rho|^2$.

Figure 4:
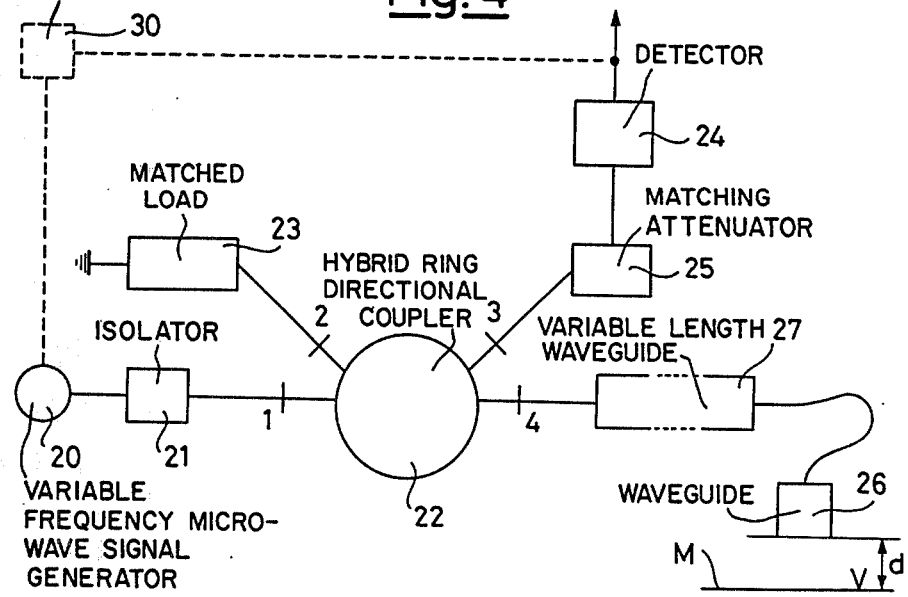
FIG. 4 is a diagram of said second embodiment of the device according to the invention.

The measuring device might thus take a form as shown diagrammatically for the embodiment of FIG. 4.

A microwave signal generator 20 delivers signals through an isolator 21 to the port 1 of a hybrid ring directional coupler 22. To the port 2 of the coupler 22 a matched load 23 is connected. To the port 3 a detector 24 is connected via a matching attenuator 25 which prevents signal feedbacks towards the coupler 22. To the port 4 a waveguide 26 is connected, which is directed perpendicularly to the surface of the molten metal bath M and is associated to another waveguide 27 of a variable length, which latter is placed between the coupler 22 and the waveguide 26.

The coupler, for the reasons given hereinbefore, will be so designed as to satisfy in it the relationship $K=\alpha(1-\alpha)|\rho|^2$.

The variability of the length of the waveguide 27 enables the device of FIG. 4 to be calibrated to a zone of maximum sensitivity.

As a matter of fact, the output signal of the detector 24, as outlined above, is entirely similar to V(d) and is of a sine wave type. Thus the maximum variations of V(d) as d is varied, are experienced at a position which is intermediate between a maximum and a minimum of V(d). Once that a certain distance, d, is preselected, there is the possibility, deriving from the analysis of the formula which defines V(d), of reaching the aforementioned intermediate position of maximum sensitivity, that which is obtained by varying $d_o$. On the other hand, in this embodiment with a hybrid ring directional coupler, similarly to what has been said for the embodiment with the antenna, $d_o$ is a constant which depends on the electrical distance between the molten metal bath surface M and the port 4: a variation of the length of the waveguide 27 involves a variation of said electrical distance.

Also in the antenna device it is likewise possible to provide, between the waveguide which is the irradiation head and the antenna, a second variable-length waveguide.

Instead of changing $d_o$ and thus the length of the waveguide 27, it can be derived, still from the formula which defines V(d), that the operation of selection of the maximum sensitivity can be carried out by varying $\lambda$, that is, by varying the frequency of the oscillator 20.

To this purpose, it is possible to provide a regulation and control circuit, diagrammatically depicted in FIG. 4 by a dash-and-dot outlined block 30 which operates as follows.

The regulation and control circuit 30 controls the oscillator 20, which is, of necessity, a variable frequency oscillator, so that the oscillator emits a series of signals with different frequencies, equally spaced apart from each other and with the same power. For every one of them, the block 30 reads out and stores the amplitude of the corresponding values of the output voltage from the detector 24. The block 30 then selects the average frequency between the two consecutive frequencies between which the maximum variation of the amplitude of the corresponding detected signals has been found.

Finally, the block 30 commands the oscillator to use that frequency.

It will be seen that, according to the objects of the invention, the presence of slags (which generally have a high resistivity) on the molten metal bath surface M does not disturb the measurements appreciably.

I claim:

1. A device for measuring the level of the metal surface of a molten metal bath comprising a microwave signal generator for producing fixed frequencies connected to an irradiating head; said irradiating head including a waveguide arranged with its axis perpendicular to the metal surface of the molten metal bath to receive a reflected wave; means being further provided for sensing, in a position fixed in space, the value of a field determined by a standing wave which is established in said waveguide and to deliver a signal which is a function of that value of the field to a detector.

2. A device according to claim 1, characterized in that said means for sensing the value of the field determined by a standing wave includes an antenna inserted into said waveguide.

3. A device according to claim 1, characterized in that said signal generator is connected to said waveguide via a directional coupler, to a port (1) of which said generator is connected, a second port (4) being connected to a waveguide which has a reflecting load, matched nonreflecting loads being connected to two other ports (2 and 3), said directional couples being designed with the power emerging from one of said ports (3) being a signal substantially depending on the position of said reflecting load.

4. A device according to claim 3, characterized in that between said generator and said directional coupler an isolator is inserted which prevents the feedback of the signal towards said generator.

5. A device according to claim 3, characterized in that the signal exiting one of said ports (3) of said directional coupler is sent to said detector to obtain a signal indicating the distance of the level of the metal surface of the molten bath from said waveguide.

6. A device according to claim 1, characterized in that between said waveguide and said means for sensing the value of the field determined by a standing wave, a second, variable-length waveguide is inserted.

7. A device according to claim 5, characterized in that it comprises a regulation and control circuit inserted between said detector and said microwave signal generator, said regulation and control circuit comprising means for driving said generator to deliver a series of signals at different frequencies, means for reading and storing the amplitudes of the corresponding values of the output signals of said detector, means for selecting the average frequency between the two consecutive frequencies between which the maximum variation of the corresponding values of the output signals from said detector has occurred, driving means for said generator to have it emitting said average frequency.

* * * * *